United States Patent [19]

Lomp et al.

[11] Patent Number: 5,384,780
[45] Date of Patent: Jan. 24, 1995

[54] HIGH SPEED MODEM, METHOD AND SYSTEM FOR ACHIEVING SYNCHRONOUS DATA COMPRESSION

[75] Inventors: Martin G. Lomp, Wrentham; Frank Fulling, Attleboro; Wayne M. DeMello, Newton; William A. Neagle, Stoughton, all of Mass.

[73] Assignee: Codex Corporation, Mansfield, Mass.

[21] Appl. No.: 62,916

[22] Filed: May 14, 1993

[51] Int. Cl.⁶ .................................. H04J 3/24
[52] U.S. Cl. .................. 370/94.1; 370/118; 375/8; 375/122; 341/61
[58] Field of Search ............ 370/94.1, 108, 109, 370/118; 375/8, 30, 122; 341/51, 60, 61, 50

[56] References Cited

U.S. PATENT DOCUMENTS

| | | | |
|---|---|---|---|
| 4,937,844 | 6/1990 | Kao | 375/122 |
| 4,975,771 | 12/1990 | Kassatly | 370/118 |
| 5,027,376 | 6/1991 | Friedman et al. | 375/122 |
| 5,048,054 | 9/1991 | Eyuboglu et al. | 375/8 |
| 5,051,991 | 9/1991 | Szczutkowski | 370/108 |
| 5,200,962 | 4/1993 | Kao et al. | 375/122 |

Primary Examiner—Douglas W. Olms
Assistant Examiner—Shick Hom
Attorney, Agent, or Firm—Darleen J. Stockley

[57] ABSTRACT

The present invention provides a novel scheme for automatically increasing data throughput in a communication system by having data compression with delay minimization done within a modem. A high speed modem includes a logical link negotiation unit for probing and determining data compression parameters (DCPs) for a synchronous data compression link with a remote modem and for inserting the DCPs and codeword combinations into compressed data. The modem also includes a physical layer connection unit coupled to synchronous data terminal equipment to provide a delay minimizing scheme that adjustably accommodates data delivery delay to the receiving modem. A method and system incorporate the functions of the high speed modem.

33 Claims, 3 Drawing Sheets

- IN A MODEM RECEIVING DATA FROM SYNCHRONOUS DTE, COMPRESSING DATA ACCORDING TO A PRESELECTED COMPRESSED DATA SCHEME — 502
- PROBING AND DETERMINING DATA COMPRESSION PARAMETERS (DCPs) FOR A SYNCHRONOUS DATA COMPRESSION LINK WITH ANOTHER MODEM, INSERTING THE DCPs AND CODEWORD COMBINATIONS INTO THE COMPRESSED DATA AND TRANSMITTING THE DATA OVER A COMMUNICATION MEDIUM TO ANOTHER MODEM — 504
- WHERE THE DATA IS RECEIVED FROM A REMOTE MODEM, REMOVING DCPs AND PREDETERMINED INSTRUCTIONS INSERTED BY THE REMOTE MODEM — 506
- DECOMPRESSING THE DECODED COMPRESSED DATA — 508
- MINIMIZING DELAY FOR RECEIVED DATA IN ACCORDANCE WITH A PREDETERMINED DELAY MINIMIZING SCHEME — 510

HIGH SPEED MODEM, METHOD AND SYSTEM FOR ACHIEVING SYNCHRONOUS DATA COMPRESSION

FIELD OF THE INVENTION

The present invention relates to data compression and, more particularly, to synchronous data compression.

BACKGROUND

Data compression, the reversible re-encoding of information into a reduced format, has been shown to provide distinct advantages in both storing and transmitting information in data communication systems. The reduced format allows information to be communicated more quickly, saving time and cost. Numerous compression schemes are available. Each compression scheme utilizes a "dictionary" to code and decode information into/from codeword combinations.

Typically, an analog modem transmits data from attached synchronous data terminal equipment (DTE) to remote synchronous DTE at the modem's analog channel data rate. In order to compress data, a selected portion of data must be accumulated first, then compressed to the selected codeword combination. This injects a delay into the transmission process. Again, when the compressed data is received at the remote modem, the selected codeword combination must be decompressed to provide the original data information. Thus, compression of data at the modem causes delays both at the source modem and the destination modem. In addition, buffering and retransmissions that occur when using error-correction can cause a problem of underrun conditions at a receiving DTE.

In order to eliminate the modem's error correction, the data compression must include an algorithm with a self-synchronizing code, being an algorithm that is completely different from presently utilized algorithms. Such an algorithm would probably have significantly lower data throughput in comparison with V.42bis in channels with a high error rate.

The scheme of varying a clocking rate when sending data to the DTE has been utilized in some existing products such as statistical multiplexors that implement synchronous data compression. However, this approach has the disadvantage that the DTE is required to tolerate speed changes, which is not a capability for all DTEs. Also, this approach requires greater complexity and hardware changes to the system.

Hence, for high speed synchronous data transmission, there is a need for providing a modem, method and system for compensating, in the modem, for the delays introduced by the data compression and error-correction such that throughput is increased.

SUMMARY OF THE INVENTION

A high speed modem provides data transmission with substantially improved synchronous data compression. The modem includes a physical layer connection unit, operably coupled to transmit/receive data to/from synchronous data terminal equipment (DTE), for converting the transmitted/received data to a preselected compressed/decompressed data scheme according to a predetermined scheme and for minimizing delay for received data.

The modem further includes a logical link negotiation unit, operably coupled to the physical layer connection unit, for probing and determining data compression parameters (DCPs) for a synchronous data compression link with another modem, inserting/removing the DCPs and codeword combination into/from the compressed data to provide encoded/decoded compressed/decompressed data and transmitting/receiving the data over a communication medium to/from the other modem.

DETAILED DESCRIPTION OF A PREFERRED EMBODIMENT

The present invention provides a novel scheme for automatically increasing data throughput in a communication system by having data compression done within a modem. A key aspect of the present invention is that a remote modem is allowed to begin transmitting a synchronous data frame to its DTE before the entire frame has been received from a local modem. New techniques are provided to minimize throughput delay both at a source modem and a destination modem. In addition, the invention provides a unique system for probing the capability of a remote modem and for negotiating synchronous link and compression parameters.

Figure 1:
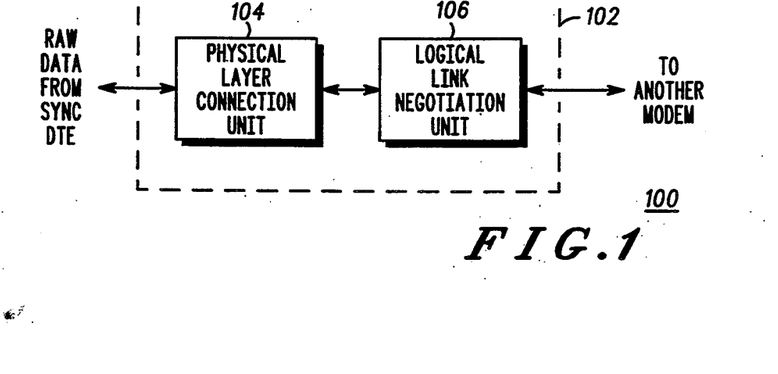
FIG. 1 shows a functional block diagram of one embodiment of a high speed modem in accordance with the present invention.

FIG. 1, numeral 100, shows a functional block diagram of one embodiment of a high speed modem in accordance with the present invention. A high speed modem (102) is set forth for providing synchronous data compression. The modem includes a physical layer connection unit (104) and a logical link negotiation unit (106). The physical layer connection unit (104) is operably coupled to receive data from synchronous data terminal equipment (DTE). The received data is compressed according to a predetermined scheme. Similarly, for receiving data from a remote modem, the physical layer connection unit (104) decompresses the received data, utilizes a delay minimizing scheme (see below), and transmits the delay-minimized data to selected synchronous DTE.

Typically, the preselected compressed data scheme is a modified version of one of: the CCITT (International Telegraph and Telephone Consultative Committee) standard V.42, and the CCITT standard V.42bis. The present invention allows, for example, local and remote modems' DTE's to transmit and receive data using a high level data link control (HDLC-like) protocol or a bisync protocol while a modified version of the CCITT V.42bis data compression compresses and decompresses the data at both sides to achieve throughput greater than the modem's DCE (data communications equipment) rate. HDLC-like protocols include, for example, IBM systems network architecture (SNA), X.25 packet switching, statistical multiplexing, and local area network (LAN) routers. Bisync protocol, i.e., BISYNC, is a protocol that was invented in 1964, in which the bit strings representing individual characters are delineated by control character sequences rather than being synchronous.

Typical DTE rates suitable for the invention include rates at least up to 56 Kbps. In one implementation, a V.42 error-control scheme known as Link Access Procedure—Modem (LAPM) error correction system is used together with a modified version of CCITT V.42bis data compression to transmit and receive compressed data. The modification is described more fully below. The invention is implementable, for example, on dial, 2-wire, and 4-wire lease line modems wherein the modulation modes and DCE rates are selectable.

Buffers in the DTE of both receiving and transmitting modems are selected to be large enough to permit capturing of an entire window of data from the synchronous DTE's link layer protocol. For example, a 10K byte buffer for each of the receiving and transmitting modems DTE data is a suitable buffer size.

Window and frame sizes for synchronous data compression are generally selectable, as long as the total number of characters in the window (window size (in frames) x frame size (characters)) does not exceed the buffer space.

The logical link negotiation unit (106) is operably coupled to the physical layer connection unit (104) and is utilized for probing and determining data compression parameters (DCPs) for a synchronous data compression link with another modem, inserting/removing the DCPs and codeword combination into/from the compressed data to provide encoded/decoded compressed/decompressed data and transmitting/receiving the data over a communication medium to/from the other modem. For example, in one embodiment, a LAPM manufacturer ID field along with a new synchronous data compression field at an end of a selected ID frame may be utilized to negotiate a reliable link with compression. Where both a local and a remote modem include the synchronous data compression (SDC) of the present invention and the SDC is enabled, a synchronous reliable link may be negotiated and established.

Figure 2:
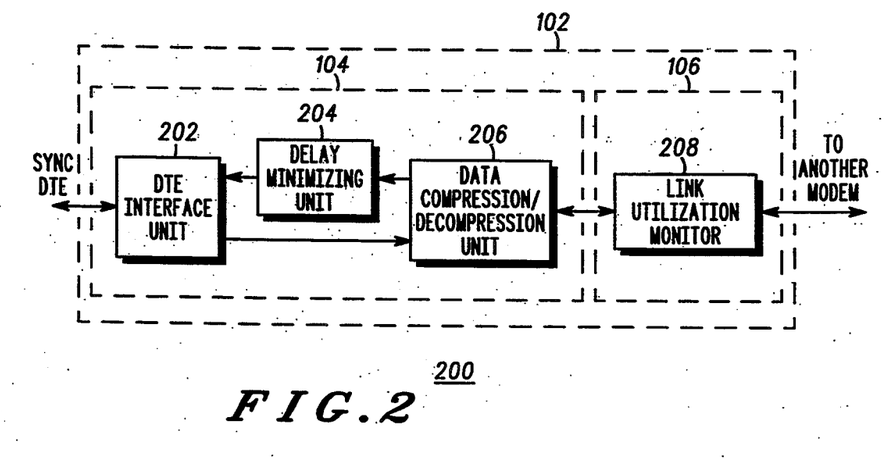
FIG. 2 shows a functional block diagram of a first embodiment of a high speed modem in accordance with the present invention.

FIG. 2, numeral 200, shows a functional block diagram of a first embodiment of a high speed modem in accordance with the present invention. The physical layer connection unit (104) includes: a data terminal equipment (DTE) interface unit (202), operably coupled to receive data from the synchronous data terminal equipment (DTE), for transmitting/receiving data to/from the synchronous DTE, a delay minimizing unit (204), operably coupled to the DTE interface, for minimizing throughput delay for received data in accordance with a current packet size, a data compression/decompression unit (206), for compressing data, being operably coupled to the DTE, and, for decompressing data, operably coupled to the delay minimizing means which is coupled to the DTE, for compressing/decompressing the data in accordance with a preselected codeword combination scheme. The logical link negotiation unit (106) includes a link utilization-monitor (208), operably coupled to the data compression/decompression unit, for utilizing a monitoring routine for available channel bandwidth. The monitoring routine determines available channel bandwidth (link) utilization in accordance with an algorithm of a form:

Link utilization = (TP(t)/DCE rate) * 100%,
where throughput (TP(t)) at a time t is determined according to:
TP(t) = TP(t−1) + [($\frac{1}{4}$)*(bits transmitted/received in a last second)]- TP(t−1)/4,
where TP(t−1) represents throughput at a time t−1, and t is an integer number of seconds, and DCE rate is a rate of the modem aggregate throughput in each direction expressed as a number of bits of data transmitted/received per second.

Clearly, utilization of the delay minimizing unit (204) utilizes a scheme that allows a remote modem to begin transmitting a synchronization frame to its DTE before an entire frame has been received from a local modem. The scheme is based on frame size.

For example, two types of data transfer may, as preselected, be implemented: one, packet delivery to the DTE interface is delayed until all of a packet is received from the remote modem, and two, packet delivery to the DTE interface is delayed until a threshold amount of the packet has been received.

Clearly, a threshold may be determined in a number of different ways. For example, in one implementation, the threshold is determined by setting a current packet size to a largest packet size that the modem can receive from the DTE. Then, the threshold is set to 90% of the largest received packet. The threshold is further reduced after each frame is delivered to the DTE interface until there is a danger of underrunning the DTE. In this case, the threshold is incremented, and optimal throughput delay is achieved. Alternatively, the threshold is reduced after each frame is delivered to the DTE interface until a packet size change has been detected. That is, when a packet which is larger than the current packet size is received or a predetermined number of smaller packets has been received, the new packet size becomes the next current packet size. In this case, the threshold is reset to 90% of the next current packet size, and slightly less than optimal throughput delay is achieved. Clearly, the determination of the next current packet size for predetermined number of smaller packets is selectable, for example, being an average of the sizes of the predetermined number of smaller packets.

The data compression/decompression unit (206) is operably coupled to the DTE interface and compresses data received from the DTE interface. In similar fashion, this data compression/decompression unit (206) also decompresses data received from the delay minimizing unit (204) which is coupled to the DTE interface (202). Compression and decompression are achieved in accordance with a preselected symbol combination scheme, typically V.42bis.

Figure 3:
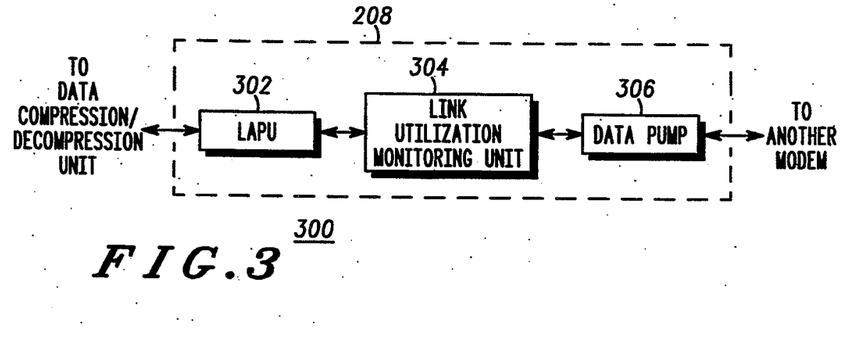
FIG. 3 shows a functional block diagram of the link utilization monitor of FIG. 2 with greater particularity.

FIG. 3, numeral 300, shows a functional block diagram of the link utilization monitor of FIG. 2 with greater particularity. The link utilization monitor includes: a link access protocol protocol unit (LAPU 302), operably coupled to the data compression/decompression unit, for providing packetized data in accordance with a CCITT LAPM data-link standard a link utilization monitoring unit (304), operably coupled between the link access protocol means and a datapump (306), for probing and determining data compression parameters (DCPs) for a synchronous data compression link with a second modem, inserting the DCPs and codeword combinations into the compressed data to provide encoded compressed data, and the datapump (306), operably coupled to the link access protocol unit, for transmitting the data over a communication medium to another modem.

A "datapump" as used herein is defined as a data transmission/reception device capable of transmitting and receiving data to a communication channel, e.g., to a telephone line. The term "underrun" as used herein is defined as the inability to deliver DTE data due to a lack of data in a delivery buffer.

The datapump (306) may be selected to determine a predetermined scheme wherein the predetermined scheme includes selection of a carrier frequency and a baud rate from a predetermined plurality of carrier frequencies and baud rates to communicate with the other modem over a communication medium in a full duplex mode based on estimated characteristics of the communication medium.

The following patent further describes a typical physical layer connection for the present invention and is hereby incorporated by reference: U.S. Pat. No. 5,214,637 issued to Manickam R. Sridhar, Aniruddha Mukherjee, and John L. Moran III on May 25, 1993 for "High Speed Two Wire Modem".

Figure 4:
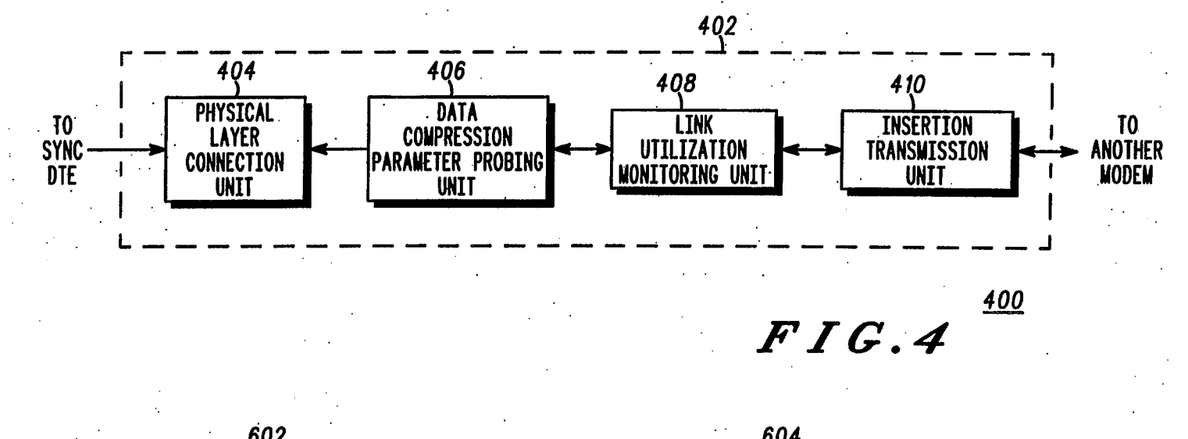
FIG. 4 shows a functional block diagram of a second embodiment of a high speed modem in accordance with the present invention.

FIG. 4, numeral 400, shows a functional block diagram of a second embodiment of a high speed modem in accordance with the present invention. In this embodiment, the high speed modem (402) for providing synchronous data compression includes a physical layer connection unit (404), a data compression parameter probing unit (406), a link utilization monitoring unit (408), and insertion-transmission unit (410). The physical layer connection unit (404) is operably coupled to transmit/receive raw data to/from synchronous data terminal equipment (DTE) and is utilized for converting the transmitted/received data to/from a preselected compressed data scheme according to a predetermined scheme and for minimizing delay for received data in accordance with a predetermined delay minimizing scheme, as described more fully above.

The data compression parameter probing unit (406) is operably coupled to the physical layer connection unit and to another modem (through an insertion-transmission unit), for determining data compression parameters for a synchronous data compression link with the other modem.

The link utilization monitoring unit (408) is operably coupled to the data compression parameter probing unit (406), for utilizing a monitoring routine for available channel bandwidth as described herein.

The insertion-transmission unit (410) is operably coupled to the data compression parameter probing unit (406), and is utilized for inserting the data compression parameters and codeword combinations into the compressed data to provide encoded compressed data and packetizing and transmitting the data over a communication medium to the other modem.

Again, the high speed modem of FIG. 4 may be modified similarly to the system shown in FIG. 2 by coupling of a delay minimizing unit between the physical layer connection means (404) and the data compression parameter probing means (406). The delay minimizing unit is utilized for minimizing throughput delay for received data in accordance with a frame size.

Similarly, the high speed modem (402) of FIG. 4 may be implemented such that the insertion-transmission unit determines a predetermined scheme (similar to that shown in FIG. 3), wherein the predetermined scheme includes selection of a carrier frequency and a baud rate from a predetermined plurality of carrier frequencies and baud rates to communicate with the other modem over a communication medium in a full duplex mode based on estimated characteristics of the communication medium.

The typical preselected compressed data scheme for the modem of FIG. 4 is as described above.

Figure 5:
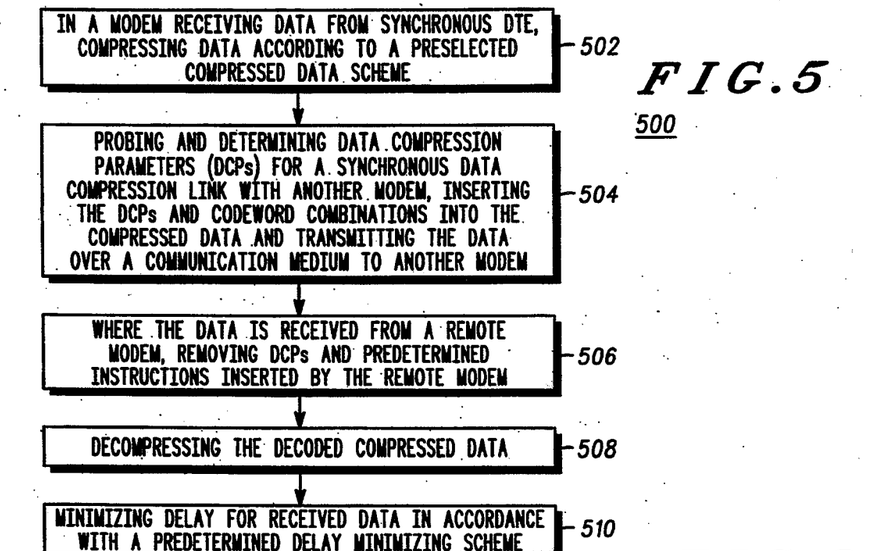
FIG. 5 shows a flow chart of steps for implementing a method for providing synchronous data compression in a high speed modem in accordance with the present invention.

The present invention includes a method, shown by a flow chart in FIG. 5, 500, for providing synchronous data compression in a high speed modem, comprising the steps of at least one of: A) where the data is received from synchronous data terminal equipment (DTE), 1) compressing the data according to a preselected compressed data scheme (502), and 2) probing and determining data compression parameters (DCPs) for a synchronous data compression link with another modem, inserting the DCPs and predetermined instructions into the compressed data to provide encoded compressed data and transmitting the data over a communication medium to another modem (504), and B) where the data is received from a remote modem, 1) removing DCPs and codeword combinations inserted by the remote modem for providing a synchronous data compression link to provide decoded compressed data (506), 2) decompressing the decoded compressed data according to the preselected compressed data scheme (508), and 3) minimizing delay for received data in accordance with a predetermined delay minimizing scheme (510).

The delay minimizing scheme of the method is as described above for the high speed modem. Also, the preselected compressed data scheme for the method is as described above.

Figure 6:
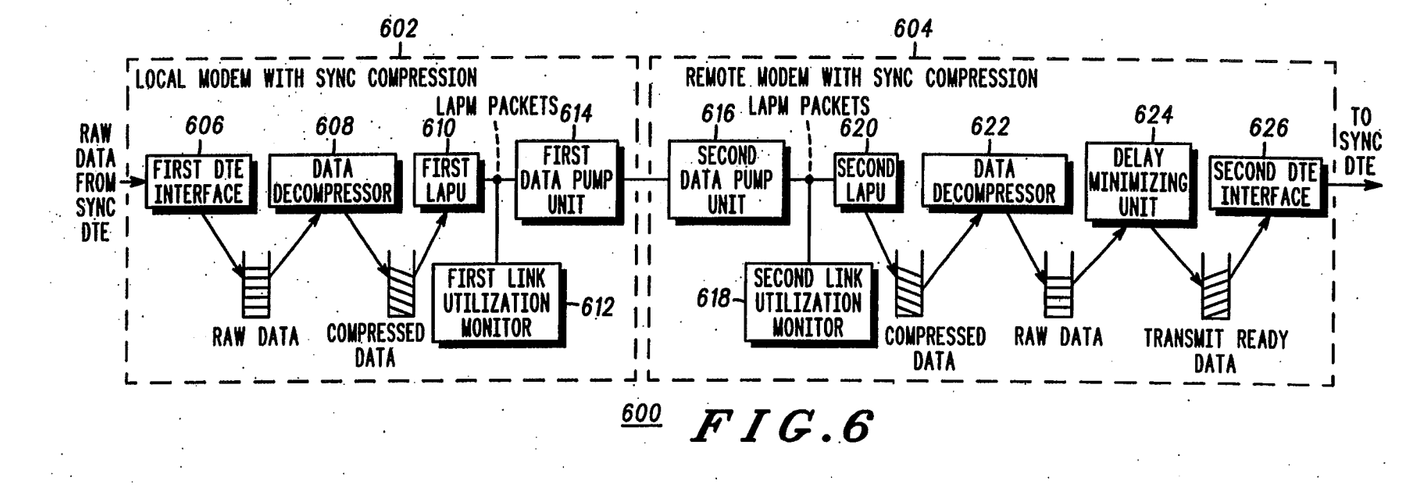
FIG. 6 shows a functional block diagram for a system for providing synchronous compressed data communication utilizing high speed modems in accordance with the present invention.

FIG. 6, numeral 600, shows a system for providing synchronous compressed data communication utilizing high speed modems in accordance with the present invention. The system comprises a first modem (602) and a second modem (604). The first modem (602) includes: a first data terminal equipment (DTE) interface (606), operably coupled to receive data from synchronous data terminal equipment, a data compressor (608), operably coupled to the first DTE interface, for compressing data in accordance with a preselected compressed data scheme, a first link access protocol unit (1st LAPU, 610), operably coupled to the data compressor, for providing packetized data in accordance with a CCITT LAPM data-link standard, a first link utilization monitor (612), operably coupled between the first link access protocol unit (610) and a first datapump unit (614), for probing and determining data compression parameters (DCPs) for a synchronous data compression link with a second modem, inserting the DCPs and codeword combination into the compressed data to provide encoded compressed data, and the first datapump unit (614), operably coupled to the first link access protocol unit, for transmitting the data (utilizing an HDLC-like protocol or bisync protocol) over a communication medium to the second modem (604).

The second modem (604) includes: a second datapump unit (616) for receiving data from the first datapump unit (614), a second link utilization monitor (618), operably coupled to monitor data transmission between the second datapump unit (616) and a second link access protocol unit (620), for monitoring data flow between the second datapump unit (616) and the second link access protocol unit (620) and for removing the DCPs and codeword combination from the compressed data to provide decoded compressed data, a second link access protocol unit (2nd LAPU, 620), operably coupled to the second datapump unit (616), for providing error correction, of the packetized data in accordance with a CCITT LAPM datalink standard, a data decompressor (622), operably coupled to the second link access protocol unit (620), for decompressing data in accordance with a preselected compressed data scheme, a delay minimizing unit (624), operably coupled to the data decompressor (622), for minimizing delay for received data in accordance with a predetermined delay minimizing scheme, and a second data terminal equipment (DTE) interface (626), operably coupled to the delay minimizing unit (624), for transmitting the delay minimized data to second synchronous data terminal equipment. This system operates as described above.

The delay minimizing unit (624) for the system is as described above.

The datapump (614) typically uses a predetermined scheme that includes selection of a carrier frequency and a baud rate from a predetermined plurality of carrier frequencies and baud rates to communicate with the other modem over a communication medium in a full duplex mode based on estimated characteristics of the communication medium.

Figure 7:
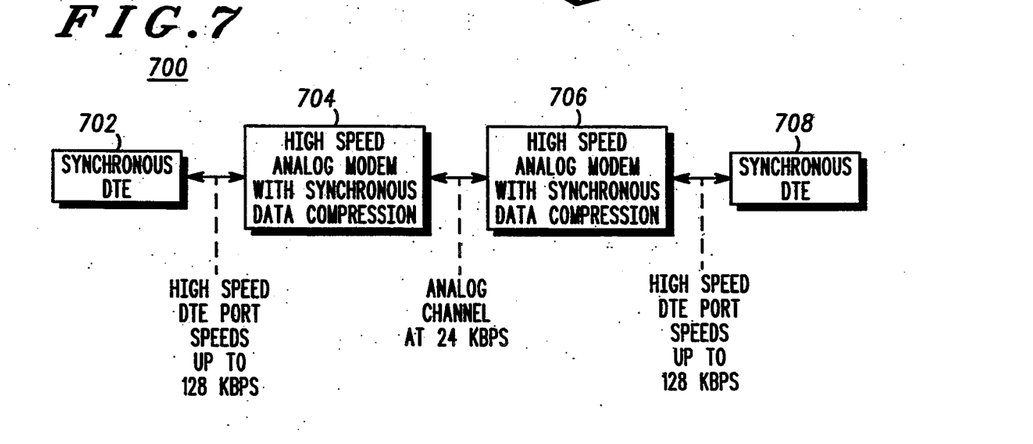
FIG. 7 shows a functional block diagram of an example showing exemplary data rates for a system for providing synchronous compressed data communication utilizing high speed modems in accordance with the present invention.

FIG. 7, numeral 700, shows a functional block diagram of an example showing exemplary data rates for a system for providing synchronous compressed data communication utilizing high speed modems in accordance with the present invention. The system includes a first synchronous DTE (702), operably coupled to a first high speed analog modem with synchronous data compression (704) utilizing high speed DTE port speeds of up to 128 kbps. The first high speed analog modem with synchronous data compression (704) is operably coupled to a second high speed analog modem with synchronous data compression (706) utilizing an analog channel at 24 kbps, The second high speed analog modem with synchronous data compression (706) is operably coupled to a second synchronous STE (708) utilizing high speed DTE port speed up to 128 kbps.

Figure 8:
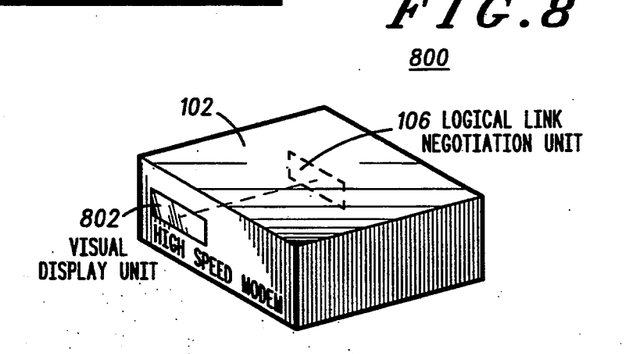
FIG. 8 is a perspective view of an exemplary modem showing a visual display unit for link utilization.

FIG. 8, numeral 800, is a perspective view of an exemplary modem showing a visual display unit (802) for link utilization. The visual display unit is operably coupled to the logical link negotiation unit (106). The visual display may be embodied, for example, as a digital readout screen, providing predetermined visual information on the status of the link being utilized.

When V.42bis compression is used for the first modem (i.e., the transmitting modem), the V.42bis routines are responsible for taking bytes from the DTE buffers, compressing the data and placing the result into DCE buffers. At the second modem (i.e., the receiving modem), the bytes are taken from DCE buffers, decompressed and placed into DTE buffers. The V.42bis code is modified to check for an end-of-frame condition for the DTE frames in the data. When an end-of frame is detected, the data is transmitted, and the second modem is notified by means of insertion of a predetermined instruction.

The decompression side (i.e., at the second modem) of V.42bis is modified to queue buffers with decompressed data until the end-of-frame instruction is received from the first modem.

Although exemplary implementations are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A high speed modem for providing efficient synchronous data compression, comprising:

A) physical layer connection means, operably coupled to transmit/receive data to/from synchronous data terminal equipment (DTE), for compressing/decompressing the transmitted/received data according to a preselected compressed data scheme and for minimizing delay for received data, and B) logical link negotiation means, operably coupled to the physical layer connection means, for probing and determining data compression parameters (DCPs) and selecting codewords for compressing synchronous data, inserting/removing the DCPs and codeword combinations into/from the compressed data to provide encoded/decoded compressed/decompressed data, and transmitting/receiving the data over a communication medium to/from the other modem.

2. The high speed modem of claim 1 wherein the physical layer connection means includes:

A) a data terminal equipment (DTE) interface unit, operably coupled to receive data from the synchronous data terminal equipment (DTE), for transmitting/receiving data to/from the synchronous DTE, B) delay minimizing means, operably coupled to the DTE interface, for minimizing throughput delay for received data in accordance with a current packet size;

C) data compression/decompression means, for compressing data, being operably coupled to the DTE, and, for decompressing data, operably coupled to the delay minimizing means which is coupled to the DTE, for compressing/decompressing the data in accordance with a preselected codeword combination scheme, and the logical link negotiation unit includes:

D) a link-utilization monitor, operably coupled to the data compression/decompression unit, for utilizing a monitoring routine for available channel bandwidth, wherein the monitoring routine determines available channel bandwidth (link) utilization in accordance with:

Link utilization=(TP(t)/DCE rate) * 100%, where throughput (TP(t)) at a time t is determined according to:

TP(t)=TP(t−1)+[($\frac{1}{4}$)*(bits transmitted/received in a last second)]- TP(t−1)/4, where TP(t−1) represents throughput at a time t−1, and t is an integer number of seconds, and DCE/data communications equipment) rate is a rate of the modem aggregate throughput in each direction expressed as a number of bits of data transmitted/received per second.

3. The high speed modem of claim 2 wherein, where data is packetized, the delay minimizing means delivers packets of data to the DTE interface in accordance with one of A-B:
   A) a scheme in which packet delivery to the DTE interface is delayed until all of a packet is received from a remote modem, or
   B) a scheme in which delivery to the DTE interface is delayed until a threshold amount of a packet has been received.

4. The high speed modem of claim 3 wherein the threshold amount is one of A-B:
   A) a value determined by:
      A1) setting a current packet size to a largest packet size that the modem can utilize,
      A2) setting the threshold to 90% of the largest received packet, and
      A3) reducing the threshold after each frame is delivered to the DTE interface until there is a danger of underrunning the DTE, upon which case the threshold is incremented, or
   B) a value determined by:
      B1) setting a current packet size to a largest packet size that the modem can utilize,
      B2) reducing the threshold after each frame is delivered to the DTE interface until a packet size change has been detected,
      B3) where packet(s) of a different size is/are received, i.e., where a packet that is larger than the current packet size or a predetermined number of smaller packets has been received, a new packet size determined by the different size received packet(s) becomes the next current packet size, and the threshold is reset to 90% of the next current packet size.

5. The high speed modem of claim 1 wherein the link utilization-monitor includes:
   A) a link access protocol means, operably coupled to the data compression/decompression unit, for providing packetized data in accordance with a CCITT LAPM data-link standard,
   B) a link utilization monitoring unit, operably coupled between the link access protocol means and a datapump, for probing and determining data compression parameters (DCPs) for a synchronous data compression link with a second modem, inserting the DCPs and codeword combinations into the compressed data to provide encoded compressed data, and
   C) the datapump, operably coupled to the link access protocol means, for transmitting the data over a communication medium to another modem.

6. The high speed modem of claim 1 wherein the preselected compressed data scheme is a modified version of one of A-B:
   A) the CCITT (International Telegraph and Telephone Consultative Committee) standard V.42, or
   B) the CCITT (International Telegraph and Telephone Consultative Committee) standard V.42bis.

7. The high speed modem of claim 1 wherein the logical link negotiation means further determines a predetermined scheme that includes selection of a carrier frequency and a baud rate from a predetermined plurality of carrier frequencies and baud rates to communicate with the other modem over a communication medium in a full duplex mode based on estimated characteristics of the communication medium.

8. The high speed modem of claim 1 wherein the synchronous data is in accordance with one of A-D:
   A) IBM systems network architecture (SNA),
   B) X.25 packet switching,
   C) statistical multiplexing, and
   D) local area network (LAN) routers.

9. The high speed modem of claim 1 further including a visual display unit, operably coupled to the logical link negotiation means, for link utilization.

10. A high speed modem for providing efficient synchronous data compression, comprising:
    A) physical layer connection means, operably coupled to transmit/receive data to/from synchronous data terminal equipment (DTE), for decompressing/compressing the transmitted/received data according to a predetermined compressed data scheme and for minimizing delay for received data in accordance with a predetermined delay minimizing scheme,
    B) data compression parameter probing means, operably coupled to the physical layer connection means and to another modem (through an insertion-transmission means), for probing and determining data compression parameters and selecting codewords for compressing synchronous data, and
    C) the insertion-transmission means, operably coupled to the data compression parameter probing means, for inserting the data compression parameters and codeword combinations into the compressed data to provide encoded compressed data and packetizing and transmitting the data over a communication medium to the other modem.

11. The high speed modem of claim 10 further including at least one of:
    A) delay minimizing means operably coupled between the physical layer connection means and the data compression parameter probing unit, for minimizing throughput delay for received data in accordance with a current packet size, and
    B) means of the insertion-transmission means for minimizing throughput delay for received data in accordance with a monitoring routine for monitoring utilization of available channel bandwidth, wherein the monitoring routine determines available channel bandwidth (link) utilization in accordance with an algorithm of a form:
    Link utilization=(TP(t)/DCE rate) * 100%,
    where throughput (TP(t)) at a time t is determined according to:
    $TP(t) = TP(t-1) + [(\frac{1}{4})*(\text{bits transmitted/received in a last second})] - TP(t-1)/4$,
    where TP(t−1) represents throughput at a time t−1, and t is an integer number of seconds, and DCE rate is a rate of the modem aggregate throughput in each direction expressed as a number of bits of data transmitted/received per second.

12. The high speed modem of claim 11 wherein, where data is packetized, the delay minimizing means delivers packets of data to the DTE interface in accordance with one of:
    A) a scheme in which packet delivery to the DTE interface is delayed until all of a packet is received from a remote modem, and
    B) a scheme in which delivery to the DTE interface is delayed until a threshold amount of a packet has been received.

13. The high speed modem of claim 12 wherein the threshold amount is one of:
   A) a value determined by:
      A1) setting a current packet size to a largest packet size that the modem can utilize,
      A2) setting the threshold to 90% of the largest received packet, and
      A3) reducing the threshold after each frame is delivered to the DTE interface until there is a danger of underrunning the DTE, upon which case the threshold is incremented, and
   B) a value determined by:
      B1) setting a current packet size to a largest packet size that the modem can utilize,
      B2) reducing the threshold after each frame is delivered to the DTE interface until a packet size change has been detected,
      B3) where packet(s) of a different size is/are received, i.e., where a packet that is larger than the current packet size or a predetermined number of smaller packets has been received, a new packet size determined by the different size received packet(s) becomes the next current packet size, and the threshold is reset to 90% of the next current packet size.

14. The high speed modem of claim 10 wherein the insertion-transmission means further determines a predetermined scheme that includes selection of a carrier frequency and a baud rate from a predetermined plurality of carrier frequencies and baud rates to communicate with the other modem over a communication medium in a full duplex mode based on estimated characteristics of the communication medium.

15. The high speed modem of claim 10 wherein the preselected compressed data scheme is a modified version of one of:
   A) the CCITT (International Telegraph and Telephone Consultative Committee) standard V.42, and
   B) the CCITT (International Telegraph and Telephone Consultative Committee) standard V.42bis.

16. The high speed modem of claim 10 wherein the synchronous data is in accordance with one of A-D:
   A) IBM systems network architecture (SNA),
   B) X.25 packet switching,
   C) statistical multiplexing, and
   D) local area network (LAN) routers.

17. The high speed modem of claim 10 further including a visual display unit, operably coupled to the logical link negotiation means, for link utilization.

18. A method for providing efficient synchronous data compression in a high speed modem, comprising the steps of at least one of A-B:
   A) where the data is received from synchronous data terminal equipment (DTE),
      1) compressing the data according to a preselected compressed data scheme,
      2) probing and determining data compression parameters (DCPs) and selecting codewords for compressing synchronous data, inserting the DCPs and codeword combinations into the compressed data to provide encoded compressed data and transmitting the data over a communication medium to another modem, and
   B) where the bit synchronous protocol data is received from a remote modem,
      1) removing DCPs and codeword combinations inserted by the remote modem for providing a synchronous data compression link to provide decoded compressed data,
      2) decompressing the decoded compressed data according to the preselected compressed data scheme, and
      3) minimizing delay for received data in accordance with a predetermined delay minimizing scheme.

19. The method of claim 18 wherein at least one of:
   A) the step of minimizing delay includes minimizing throughput delay for received data in accordance with a current packet size, and
   B) monitoring utilization of available channel bandwidth, wherein the monitoring routine determines available channel bandwidth (link) utilization in accordance with an algorithm of a form:

Link utilization=(TP(t)/DCE rate) * 100%, where throughput (TP(t)) at a time t is determined according to:

$TP(t)=TP(t-1)+[(\frac{1}{4})*(bits\ transmitted/received\ in\ a\ last\ second)]- TP(t-1)/4$, where TP(t−1) represents throughput at a time t−1, and t is an integer number of seconds, and DCE/data communications equipment) rate is a rate of the modem aggregate throughput in each direction expressed as a number of bits of data transmitted/received per second.

20. The method of claim 18 wherein, where data is packetized, the delay minimizing scheme includes delivering packets of data to the DTE interface in accordance with one
   A) a scheme in which packet delivery to the DTE interface is delayed until all of a packet is received from a remote modem, and
   B) a scheme in which delivery to the DTE interface is delayed until a threshold amount of a packet has been received.

21. The method of claim 20 wherein the threshold amount is one of:
   A) a value determined by:
      A1) setting a current packet size to a largest packet size that the modem can utilize,
      A2) setting the threshold to 90% of the largest received packet, and
      A3) reducing the threshold after each frame is delivered to the DTE interface until there is a danger of underrunning the DTE, upon which case the threshold is incremented, and
   B) a value determined by:
      B1) setting a current packet size to a largest packet size that the modem can utilize,
      B2) reducing the threshold after each frame is delivered to the DTE interface until a packet size change has been detected,
      B3) where packet(s) of a different size is/are received, i.e., where a packet that is larger than the current packet size or a predetermined number of smaller packets has been received, a new packet size determined by the different size received packet(s) becomes the next current packet size, and the threshold is reset to 90% of the next current packet size.

22. The method of claim 18 wherein probing and determining data compression parameters (DCPs) and selecting codewords for compressing synchronous data, inserting the DCPs and codeword combinations into the compressed data to provide encoded compressed data and transmitting the data over a communication medium to another modem includes determining a preselected scheme that includes selecting a carrier frequency and a baud rate from a predetermined plurality of carrier frequencies and baud rates to communicate with the other modem over a communication medium in a full duplex mode based on estimated characteristics of the communication medium.

23. The method of claim 18 wherein the preselected compressed data scheme is a modified version of one of:
A) the CCITT (International Telegraph and Telephone Consultative Committee) standard V.42, and
B) the CCITT (International Telegraph and Telephone Consultative Committee) standard V.42bis.

24. The high speed modem of claim 18 wherein the synchronous data is in accordance with one of:
A) IBM systems network architecture (SNA),
B) X.25 packet switching,
C) statistical multiplexing, and
D) local area network (LAN) routers.

25. The method of claim 18 further including providing a visual display unit, operably coupled to the logical link negotiation means, for link utilization.

26. A system for providing efficient synchronous compressed data communication utilizing high speed modems, comprising:
a first modem that includes:
A) a first data terminal equipment (DTE) interface, operably coupled to receive data from synchronous data terminal equipment,
B) a data compressor, operably coupled to the first DTE interface, for determining and selecting codewords for compressing synchronous data in accordance with a preselected compressed data scheme,
C) a first link access protocol means, operably coupled to the data compressor, for providing packetized data in accordance with a CCITT LAPM data-link standard,
D) a first link utilization monitor, operably coupled between the first link access protocol means and a first datapump means, for probing and determining data compression parameters (DCPs) for a synchronous data compression link with a second modem, inserting the DCPs and codeword combinations into the compressed data to provide encoded compressed data,
E) the first datapump means, operably coupled to the first link access protocol means, for transmitting the data over a communication medium to the second modem, and
the second modem that includes:
F) second datapump means for receiving data from the first datapump means,
G) a second link utilization monitor, operably coupled to monitor data transmission between the second datapump means and a second link access protocol means, for monitoring data flow between the second datapump unit and the second link access protocol unit and for removing the DCPs and codeword combination from the compressed data to provide decoded compressed data,
H) a second link access protocol means, operably coupled to the second datapump means, for providing error correction of the packetized data in accordance with a CCITT LAPM data-link standard,
I) a data decompressor, operably coupled to the second link access protocol means, for decompressing the synchronous data in accordance with a preselected compressed data scheme,
J) delay minimizing means, operably coupled to the data decompressor, for minimizing delay for received data in accordance with a predetermined delay minimizing scheme,
K) a second data terminal equipment (DTE) interface, operably coupled to the delay minimizing means, for transmitting the delay minimized data to second synchronous data terminal equipment.

27. The system of claim 26 further including at least one of:
A) delay minimizing means operably coupled between the physical layer connection means and the data compression parameter probing unit, for minimizing throughput delay for received data in accordance with a current packet size, and
B) means of the insertion-transmission means for minimizing throughput delay for received data in accordance with a monitoring routine monitoring utilization of available channel bandwidth, wherein the monitoring routine determines available channel bandwidth (link) utilization in accordance with an algorithm of a form:

Link utilization = (TP(t)/DCE rate) * 100%, where throughput (TP(t)) at a time t is determined according to:

$TP(t) = TP(t-1) + [(\tfrac{1}{4})*(\text{bits transmitted/received in a last second})] - TP(t-1)/4$, where TP(t−1) represents throughput at a time t−1, and t is an integer number of seconds, and DCE (data communications equipment) rate is a rate of the modem aggregate throughput in each direction expressed as a number of bits of data transmitted/received per second.

28. The system of claim 26 wherein, where data is packetized, the delay minimizing means delivers packets of data to the DTE interface in accordance with one of:
A) a scheme in which packet delivery to the DTE interface is delayed until all of a packet is received from a remote modem, and
B) a scheme in which delivery to the DTE interface is delayed until a threshold amount of a packet has been received.

29. The system of claim 28 wherein the threshold amount is one of:
A) a value determined by:
A1) setting a current packet size to a largest packet size that the modem can utilize,
A2) setting the threshold to 90% of the largest received packet, and
A3) reducing the threshold after each frame is delivered to the DTE interface until there is a danger of underrunning the DTE, upon which case the threshold is incremented, and
B) a value determined by:
B1) setting a current packet size to a largest packet size that the modem can utilize,
B2) reducing the threshold after each frame is delivered to the DTE interface until a packet size change has been detected,
B3) where packet(s) of a different size is/are received, i.e., where a packet that is larger than the current packet size or a predetermined number of smaller packets has been received, a new packet size determined by the different size received packet(s) becomes the next current packet size, and the threshold is reset to 90% of the next current packet size.

30. The system of claim 26 wherein the first DTE interface receives data according to a bit-synchronous protocol and determines a predetermined scheme that includes selection of a carrier frequency and a baud rate from a predetermined plurality of carrier frequencies and baud rates to communicate with the other modem over a communication medium in a full duplex mode based on estimated characteristics of the communication medium.

31. The system of claim 26 wherein the preselected compressed data scheme is a modified version of one of:

A) the CCITT (International Telegraph and Telephone Consultative Committee) standard V.42, and B) the CCITT (International Telegraph and Telephone Consultative Committee) standard V.42bis.

32. The system of claim 26 wherein the synchronous is in accordance with one of A–D:

A) IBM systems network architecture (SNA),
B) X.25 packet switching,
c) statistical multiplexing, and
D) local area network (LAN) routers.

33. The system of claim 26 further including a visual display unit, operably coupled to the logical link negotiation means, for link utilization.

* * * * *

UNITED STATES PATENT AND TRADEMARK OFFICE
CERTIFICATE OF CORRECTION

PATENT NO. : 5,384,780

DATED : January 24, 1995

INVENTOR(S) : Martin G. Lomp et al.

It is certified that error appears in the above-identified patent and that said Letters Patent is hereby corrected as shown below:

Column 12, line 30 "of:" is ommited at the end of the sentence.

Signed and Sealed this

Twenty-fifth Day of April, 1995

Attest:

BRUCE LEHMAN

Attesting Officer    Commissioner of Patents and Trademarks